US006526641B1

(12) United States Patent
Latham

(10) Patent No.: US 6,526,641 B1
(45) Date of Patent: Mar. 4, 2003

(54) DEVICE FOR SEPARATING CUTTING BITS FROM HOLDERS

(75) Inventor: Winchester E. Latham, Indianapolis, IN (US)

(73) Assignee: Keystone Engineering & Manufacturing Company, Avon, IN (US)

( * ) Notice: Subject to any disclaimer, the term of this patent is extended or adjusted under 35 U.S.C. 154(b) by 0 days.

(21) Appl. No.: 09/431,722

(22) Filed: Nov. 1, 1999

(51) Int. Cl.[7] .................................... B23B 19/02
(52) U.S. Cl. ........................ 29/239; 29/252; 254/18
(58) Field of Search ........................ 254/18; 29/252, 29/251, 239, 237

(56) References Cited

U.S. PATENT DOCUMENTS 2,797,889 A * 7/1957 Talboys .................... 254/18
3,579,795 A * 5/1971 Burman .................... 29/252
4,335,493 A 6/1982 Shivers, Jr. et al.
5,020,203 A 6/1991 Rix
5,129,133 A * 7/1992 Reesor .................... 29/252
5,207,730 A 5/1993 Ruggiero
5,694,672 A 12/1997 Perin
5,701,649 A * 12/1997 Reesor et al. .............. 29/252

* cited by examiner

*Primary Examiner*—Robert C. Watson
(74) *Attorney, Agent, or Firm*—Brinks Hofer Gilson & Lione

(57) ABSTRACT

The present invention resides in a tool that is provided for separating a cutting bit from a cutting bit holder used in connection with a rotary a cutting assembly for use in a roadway surface reclaiming machine. More particularly, this invention is directed to providing a tool for quickly and effectively removing cutting bits from the cutting bit holders. The present invention accomplishes this objective by providing a pulling mechanism that is mechanically assisted. In this invention, a bit puller is provided for engagement with the cutting bit and is also attached to a powered retractor to forcibly move the cutting bit. The cutting bit and the retractor are fixed to an outer frame or brace. This outer frame or brace generally circumscribes the bit puller to provide an inner space within which the bit puller can be moved by the retractor. The outer frame or brace has a surface for engaging the cutting bit holder to position the retractor during separation. The bit puller and outer frame are sectioned to permit lateral engagement of the tool with the cutting bit and holder, and are rotatable with respect to each other.

11 Claims, 8 Drawing Sheets

30
34

40
24

DEVICE FOR SEPARATING CUTTING BITS FROM HOLDERS

BACKGROUND OF THE INVENTION

1. Field of the Invention.

The present invention generally relates to tools for replacing cutting bits used in roadway reclaiming equipment. More specifically, this invention relates to a device that separates cutting bits from the cutting bit holders that connect cutting bits to rotating cutting drums on road reclamation equipment.

2. Description of the Prior Art.

Typical roadway surface reclaiming machines disclosed in the prior art include rotary driven cylindrical drums with holders holding fixed one or more cutting bits which scarify and mine the top portion of an asphaltic road surface. While several styles of drums have been employed, at least some styles have included an array of cutting bit holders fixed usually by a peripheral weld to the drum surface. Replaceable cutting bits are received within the cutting bit holders which can be periodically replaced as needed. Examples of prior art cutting bit holders are to be found in my U.S. Pat. No. 5,884,979, as well as in U.S. Pat. Nos. 5,582,468 and 5,098,167. Other examples appear as the prior art cited in these patents.

During the operation of such roadway surface reclaiming machines, the cutting bits are exposed to extreme frictional and impact forces. Although these bits are typically manufactured from hardened materials, wear and damage to the cutting bits is inevitable. As the cutting bits wear, the efficiency of the equipment that relies upon them is reduced, slowing the reclamation process and increasing the burdens imposed upon the cutting bit holders, the cutting drums and the equipment that drives these devices. This leads to delay and increased costs for additional maintenance and labor.

However, typical road surface reclamation devices use a large number of cutting bits, thus, the replacement of the cutting bits is a time consuming process, largely because the manual removal and reinstallation cutting bits is often tedious and slow. Thus, replacement of the bits is expensive both because it requires the extended attention of one or more trained mechanics and because all road reclamation operations must cease during replacement of the cutting bits. When circumstances dictate that cutting bits must be replaced during regularly scheduled reclamation activities, hundreds of labor hours can be lost.

Accordingly, what has been sought has been a tool for removing the cutting bits from their holders in a time effective manner.

However, it is often very difficult to remove cutting bits from cutting bit holders. Cutting bits are firmly affixed when they are installed. In operation, the extreme stress, thermal conditions, and environmental contamination to which these products can be exposed can tightly bind these devices.

Thus, what is needed is an effective tool for separating even tightly bound cutting bits from their holders in a time effective manner.

It might appear that a simple solution to this problem lies in providing a powerful device that can exert exceptional amounts of force upon the cutting bit and bit holder in order to separate these components. However, great care must be exercised in the application of large amounts of force to this equipment because the individual cutting bit holding elements in rotary driven cylindrical cutters are often aligned in a known manner to maximize the mining activity and facilitate removal of mine material from the kerf created by the cutting operation. In certain alignment regimens, cutting bit holding elements on one side of the drum are aligned differently than cutting bit holding elements on the opposite side of the drum. Adherence to these alignment regimens is critical to the overall efficiency of the road reclamation process. Because of this, simply providing a tool that uses substantial amounts of force to separate these components will not meet the design objectives unless this force is properly directed and channeled to prevent damage to the cutting bit holders and the drum.

Accordingly, what is needed is an effective tool for separating even tightly bound cutting bits from their holders in a time effective manner while limiting the risk of damage to the cutting bit holder and the cutting drum.

In situations where substantial amounts of force are required to separate the cutting bit from the cutting bit holder, it is occasionally the case that the cutting bit and cutting bit holder separate rapidly. When this occurs it is possible that the cutting bit will be accelerated and will gain some freedom of motion during the removal process. It is, therefore, necessary that the freedom of motion available to the cutting bit is restricted in order to limit the possibility that the cutting bit will unexpectedly contact the user of the tool, the cutting bit holder or the drum.

Thus what is needed is an effective tool for separating even tightly bound cutting bits from their holders in a time effective manner while limiting the risk of damage to the cutting bit holder and cutting drum during the separation process and further restricting the freedom of motion available to the cutting bit after separations.

SUMMARY OF THE INVENTION

In accordance with the present invention a tool is provided for separating a cutting bit from a cutting bit holder used in connection with a rotary a cutting assembly for use in a roadway surface reclaiming machine. As is discussed in more detail in U.S. Pat. No. 5,884,979, cutting bit holders are separable components that link cutting bits to a driven and rotating drum in a roadway reclaiming machine. They are fixed to the surface of the rotating drum and aligned in a predetermined pattern. They serve as a buffer between the cutting surfaces of the cutting bit and the driven surface. In extreme situations, they can separate from the driven surface before forces accumulate that will damage or deform the driven surface. They also permit the user of the equipment to replace the cutting bits as necessary without repeated modification of the driven surface.

The present invention is directed toward assisting the replacement of the cutting bits, more particularly it is directed to providing a means of quickly and effectively changing removing cutting bits from the cutting bit holders. The present invention accomplishes this objective by providing a pulling mechanism that is mechanically assisted. In this invention, a bit puller is provided for engagement with the cutting bit and also attached to a powered retractor to forcibly move the cutting bit. The cutting bit and the retractor are fixed to an outer frame or brace. This outer frame or brace generally circumscribes the bit puller to provide an inner space within which the bit puller can be moved by the retractor.

The outer frame or brace also serves to fix the position of the retractor relative to the cutting bit holder when the retractor moves the cutting bit away from the cutting bit holder. To do this, the outer frame or brace has one end that is formed to engage the cutting bit holder and another end fixed to the retractor. As noted above, it may be necessary for the retractor to apply significant force to separate the cutting bit and the cutting bit holder. Accordingly, the engagement end of the outer frame or brace is further defined to confront the cutting bit holder in a manner that limits the possibility that the cutting bit holder will be damaged by the forces created during separation.

To permit the rapid engagement of the connector to the cutting bit, the outer shield is sectioned to permit the user of the tool to laterally introduce the cutting bit into the inner space within the outer shield. This sectioning also permits the user of the tool to quickly engage the bracing surfaces of the outer shield against the appropriate surfaces of the cutting bit holding element. Similarly, the connector is configured with an opening to permit lateral engagement with the cutting bit. In this way, the user of the tool can quickly and effectively engage the connector with the cutting bit and the outer shield with the cutting bit holding element.

Because repair and maintenance circumstances will vary, the relative position of the puller bit and the engagement end of the outer frame or brace must be able to vary to ensure that the connector can engage the cutting bit while the engagement end of the outer frame or brace engages the cutting bit holding element. To accomplish this, one embodiment of the present invention provides a retractor that allows the user to selectively position the connector relative to the engagement end of the outer frame or brace. It can also be readily appreciated that the same result can be accomplished by providing an outer frame or brace that is adjustable.

In another preferred embodiment of this invention, the bit puller and outer frame or brace are rotatable relative to each other. This permits the user of the tool to align the sectioned portion of the outer frame or brace with the lateral engagement opening of the bit puller for rapid installation as discussed above. However, it also permits the user to rotate the outer shield or the opening of the connector so that they are not aligned during separation of the cutting bit from the cutting bit holder. This non-alignment greatly reduces the degree of freedom available to the cutting bit after separation Additional features and advantages of the invention will become apparent to those skilled in the art upon consideration of the following detailed description of a preferred embodiment exemplifying the best mode of carrying out the invention as presently perceived. The detailed description particularly refers to the accompanying figures.

DETAILED DESCRIPTION OF THE PREFERRED EMBODIMENT

Figure 1:
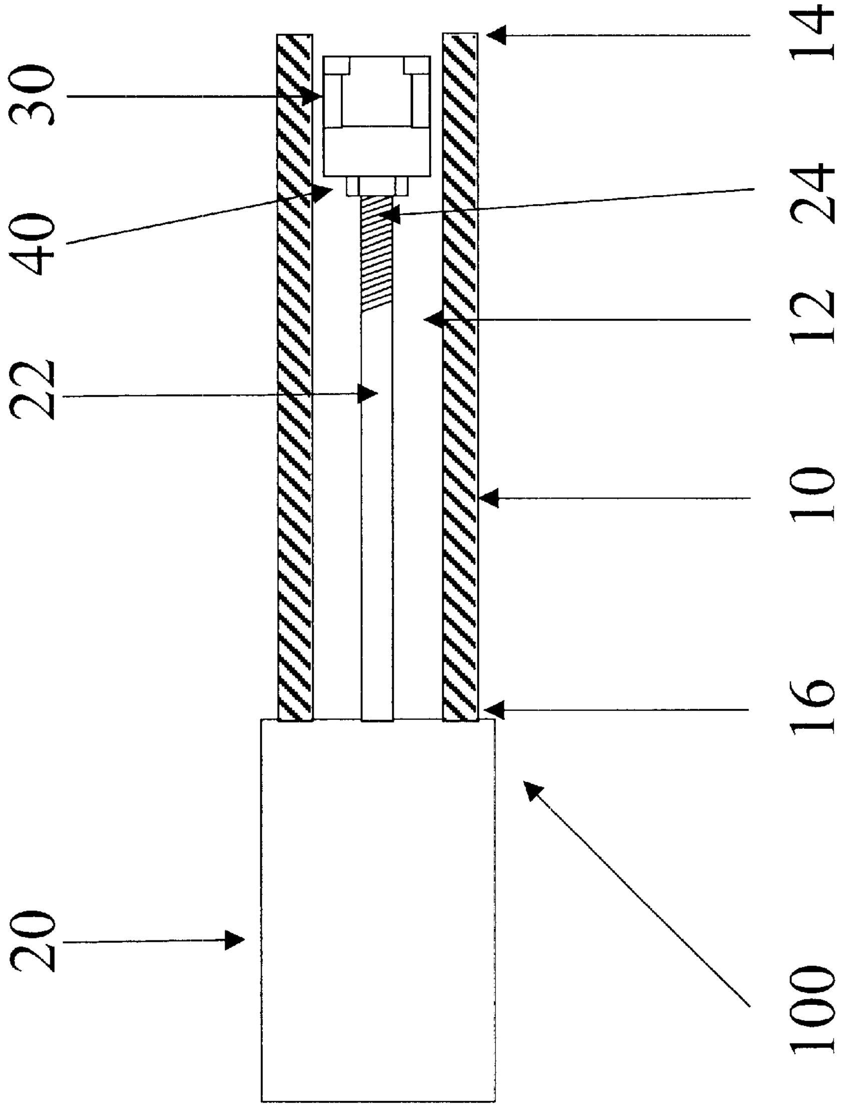
FIG. 1 shows a tool of the present invention for separating a cutting bit from a cutting bit holder with the frame or brace sectioned away to provide a view of the bit puller extension.
Figure 2:
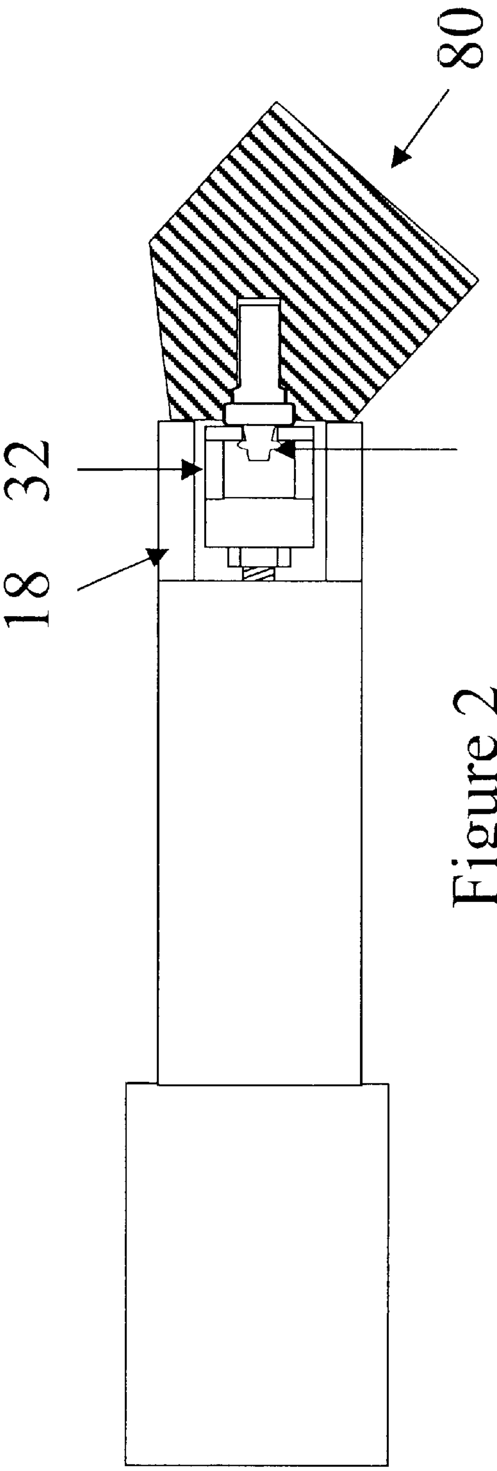
FIG. 2 is an exterior view of the tool shown in FIG. 1 engaging a cutting bit and a sectioned view of the cutting bit holder showing the placement of the cutting hit within the holder prior to separation.

A tool 100 for separating a cutting bit 90 from a cutting bit holding element 80, of the present invention is shown in FIGS. 1–12. Cutting bits 90 and cutting bit holding elements 80 such as those disclosed in U.S. Pat. No. 5,884,979, are known in the prior art. These cutting bits 90 are typically provided with engagement surfaces, such as a cutting bit peripheral groove 92, to allow the installation and removal of the cutting bit 90 from the cutting bit holding element 80. Peripheral groove 92 provides control surfaces on the cutting bit 90 to facilitate attachment of the cutting bit 90 to the cutting bit holding element 80. Cutting bit holding elements 80 provide shoulder surfaces 82 extending laterally outward beyond cutting bit 90. Simple lever type devices can be used on these surfaces to provide some mechanical advantage in generating the force required to remove the cutting bit 90 from the cutting bit holder 80. Tool 100 utilizes surfaces 22 and 92 to engage and separate the cutting bit 90 from the bit holder 80, in a way not contemplated by the prior art.

Tool 100 provides an outer frame or brace 10. Frame 10 has two ends, a first end or engagement end 14, and second end or mounting end 16. The ends 14 and 16 are separated longitudinally by a cavity or inner space 12 circumscribed by the frame 10.

Engagement end 14 of frame 10 is formed to confront the shoulder 82 of a cutting bit holder element 80.

A retractor, 20, projects an extension, 22 between the mounting end 16 and engagement end 14 of the frame 10 along the longitudinal axis of the frame 10. The retractor 20 forcibly displaces extension 22 towards and away from the engagement end 14 of the frame 10. A bit puller 30 is fixed to extension 22 for engagement with a cutting bit peripheral groove 92 of a cutting bit 90.

To facilitate rapid attachment of the cutting bit holder element 80 to bit puller, 30, frame 10, is sectioned to allow lateral insertion of the cutting bit 90 into the space 12 in the frame 10. Similarly, as is shown in FIGS. 2, 3, 6, 7, 8, and 9, bit puller 30 has a cleft region or aperture 32, to permit lateral introduction of the cutting bit 90 into the bit puller 30, and to permit lateral engagement of the bit puller 30 with the cutting bit peripheral groove 92. By permitting such lateral engagement, the time required to affix the tool 100 to the cutting bit 90 is substantially reduced thus increasing the effective rate at which multiple cutting bits 90 can be separated from cutting bit holders 80.

In a preferred embodiment of this invention, frame 10 is rotatably fixed relative to bit puller 30. This permits the user of tool 100 to laterally engage a cutting bit 90 using tool 100, when the aperture 32 of bit puller 30 and the sectioned opening 18 of the frame or brace 10 are aligned. (FIGS. 6 and 7) This also permits the user, after engagement of the cutting bit 90 with the bit puller 30, to offset the aperture 32 of bit puller 30 with the sectioned opening 18 of frame or brace 10. This can also be done to limit the degree of freedom available to a cutting bit 90, after it has been forcibly separated from a cutting bit holder 80. In order to limit the degree of freedom, the user needs only to rotate frame 10 so that the sectioned opening 18 of the frame or brace 10 is no longer aligned with the aperture 32 of puller bit 30. (FIGS. 8 and 9) This can also be done to improve the degree of engagement between the frame or brace 10 with the shoulder 82 of cutting bit holder 80 to lower the potential for damage to the cutting bit holder during separation.

Figure 3:
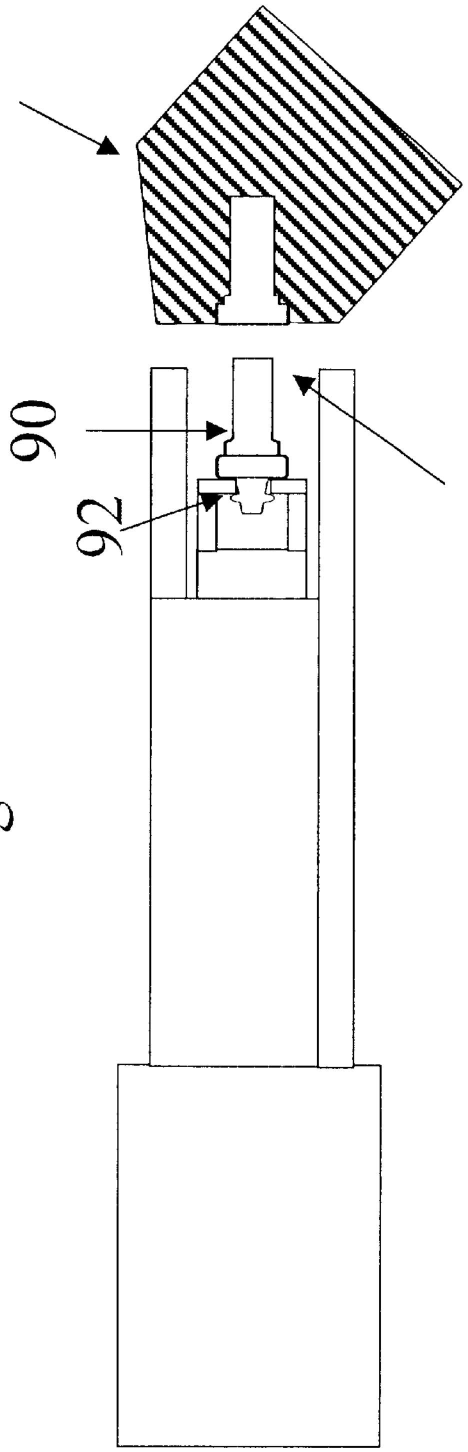
FIG. 3 shows an extrior view of the present invention similar to FIG. 2 after the tool has removed the cutting bit from the cutting holder.
Figure 4:
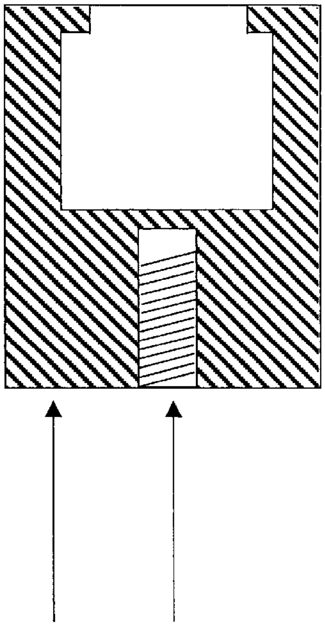
FIG. 4 is a longitudinal sectional detail view of a bit puller of the present invention.
Figure 5:
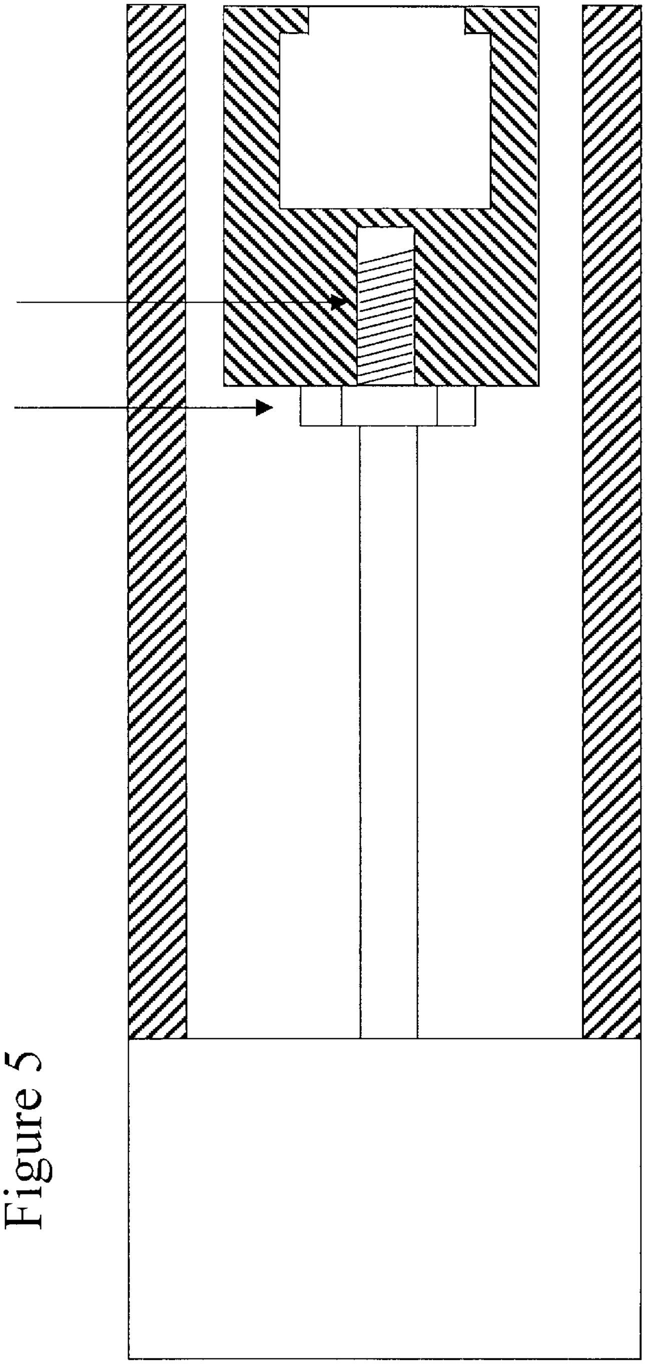
FIG. 5 is a longitudinal sectional view of the bit puller shown in FIG. 5 connected to a bit puller extension situated within a frame.
Figure 7:
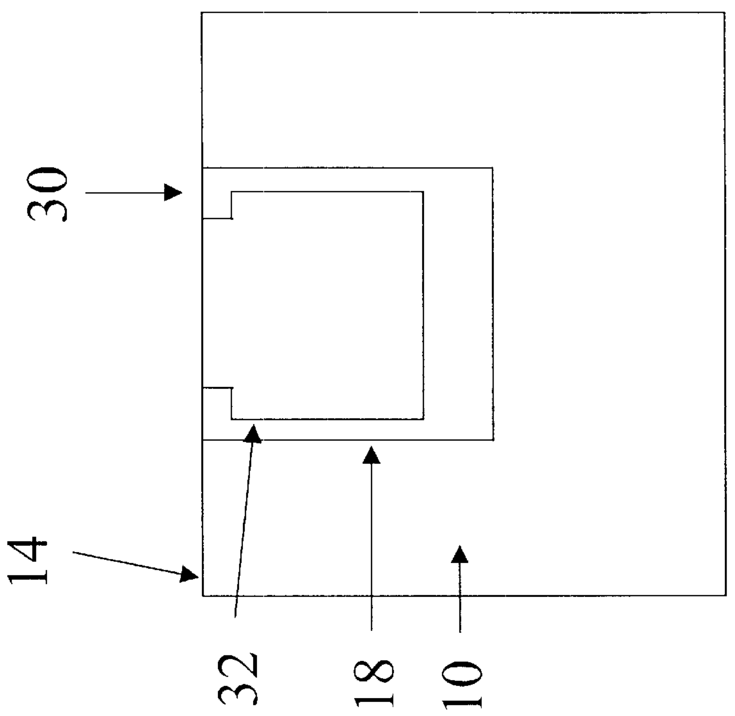
FIG. 7 is an end view of an alternative embodiment.
Figure 6:
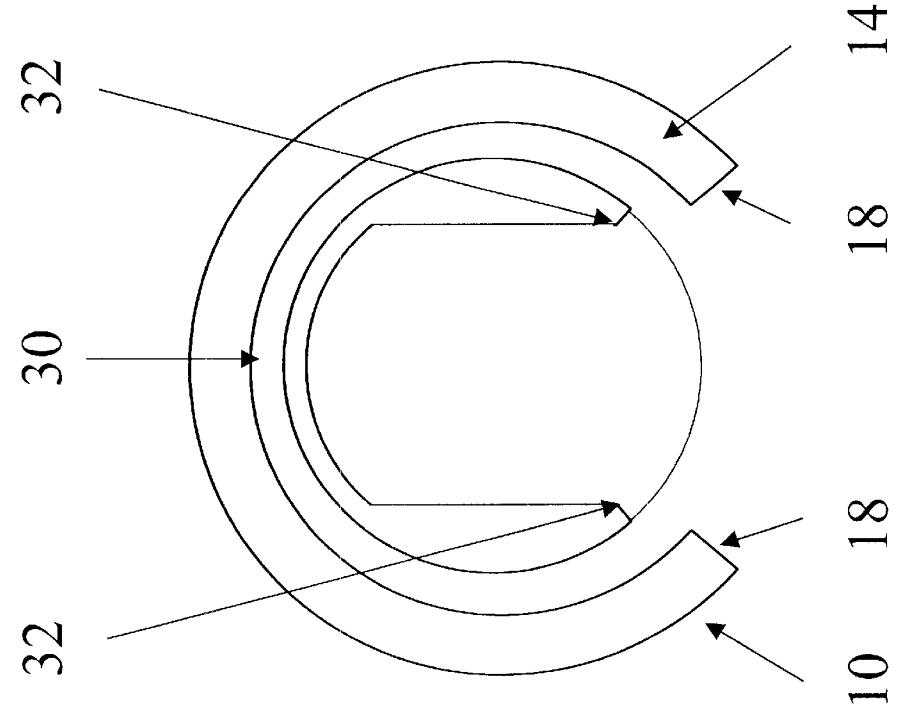
FIG. 6 is an end view of the frame and bit puller shown in FIG. 1.
Figure 9:
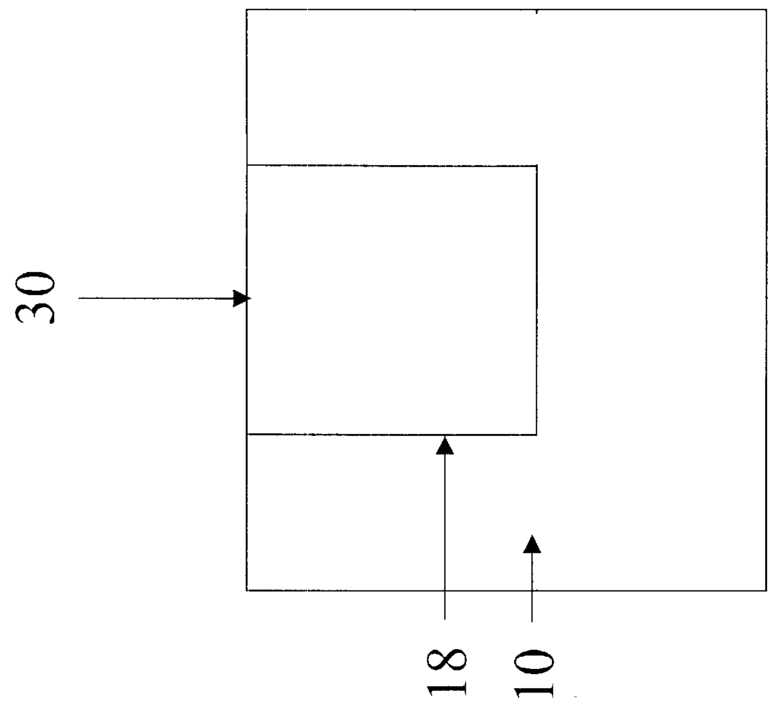
FIG. 9 shows the bit puller and the frame of FIG. 7 wherein the frame is not rotatable relative to the puller bit.
Figure 8:
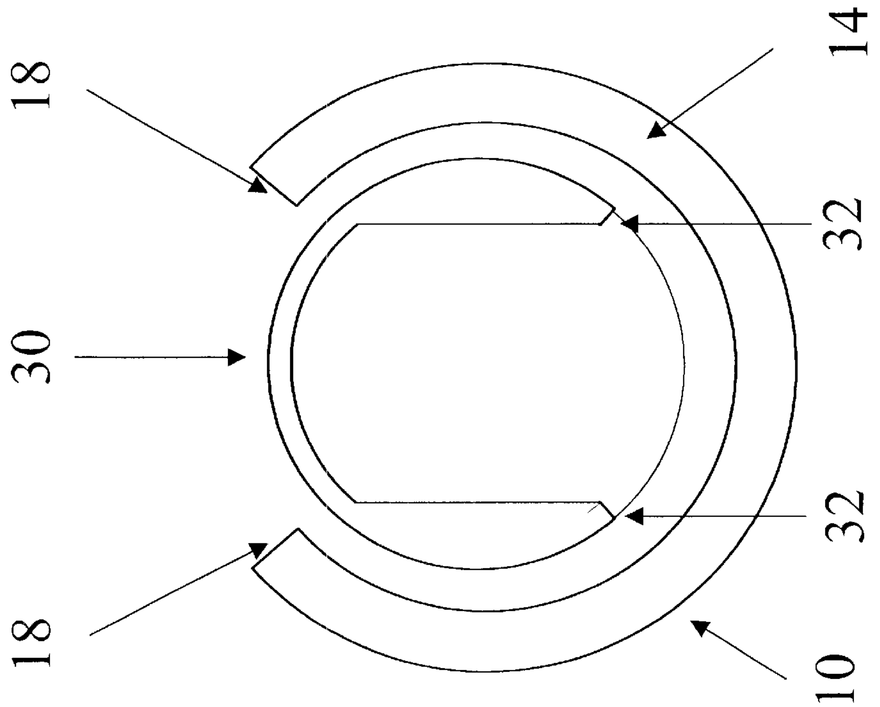
FIG. 8 is an end view of the bit puller and the frame similar to FIG. 6 wherein the frame is rotated relative to the puller bit
Figure 10:
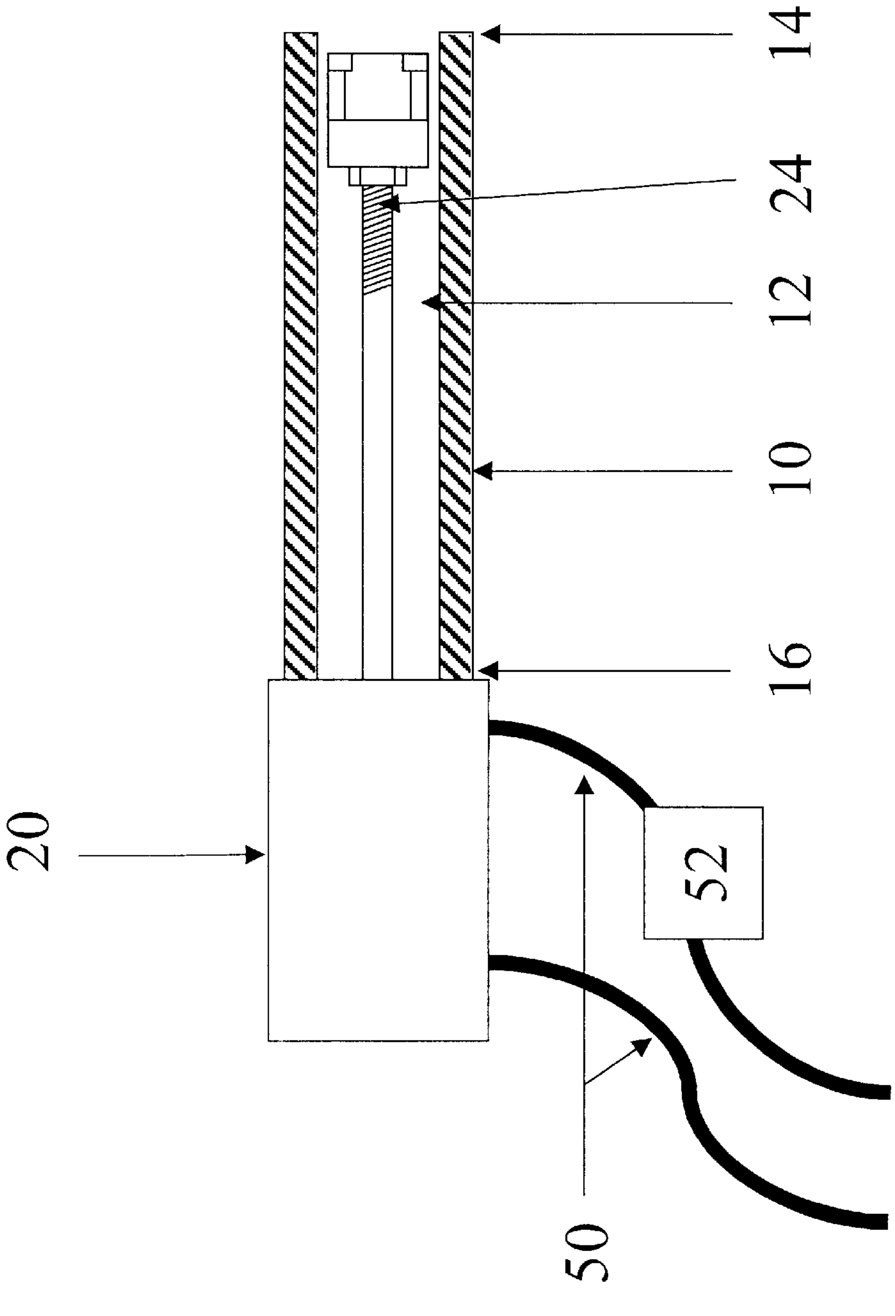
FIG. 10 shows the present Invention wherein the retractor comprises the fluid cylinder.
Figure 11:
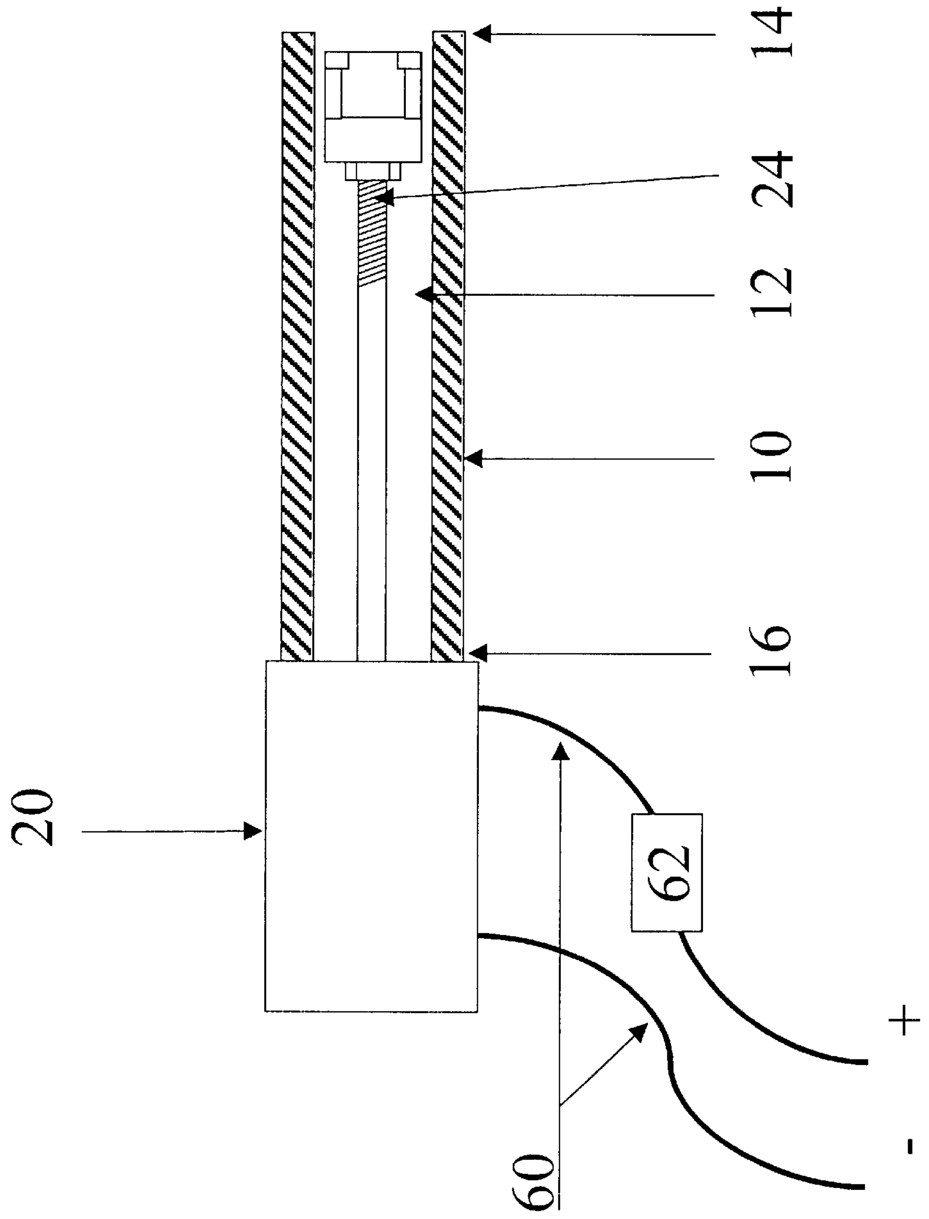
FIG. 11 shows an alternative embodiment of the invention in which a solenoid is used as the actuator.
Figure 12:
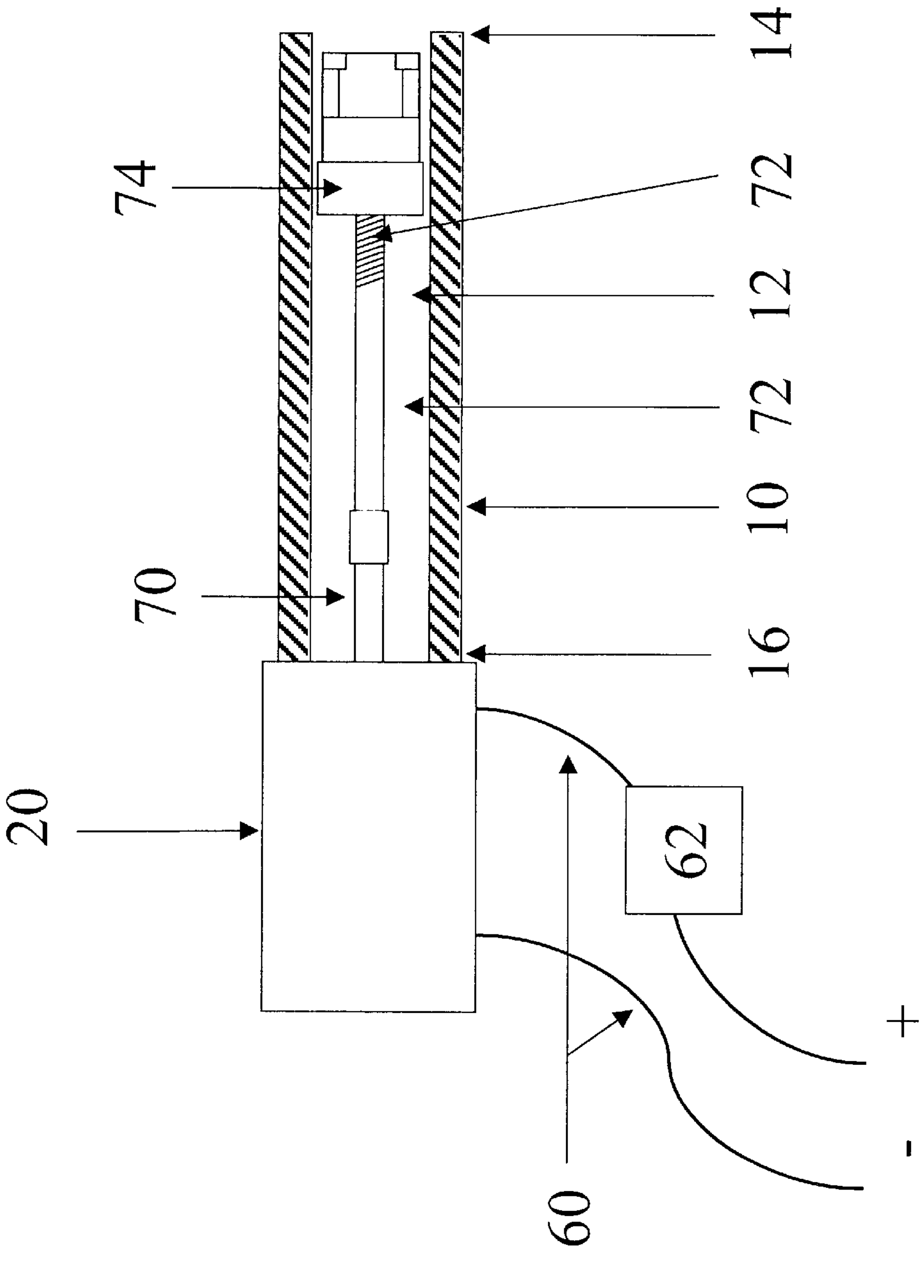
FIG. 12 shows a third embodiment of the present invention with the frame sectioned to reveal a bit puller that is rested by means of a threaded rod connected to a Journal governed by a rotating armature.

In application, puller bit 30, engages the cutting bit peripheral groove 92 while engagement end 14 of the frame or brace 10, confronts the shoulder 82 of the cutting bit holder element 80. (FIG. 2) Retractor 20 is then engaged to move the bit puller within the inner and space away from the engagement end 14 of the frame 10. This separates the cutting bit 90 from the cutting bit holder element 80. (FIG. 3)

In practice, it has been found that the longitudinal separation between cutting bit 90 and the cutting bit holder 80 is not constant. This separation may vary because of usage conditions, or design tolerances. Accordingly it is necessary that the tool 100 be adjustable. In particular, it is necessary that the separation between bit puller 30 and the engagement end 14 of the frame, be adjustable. To meet this need, in one preferred embodiment of this invention, extension 22 of retractor 20 has a threaded end 24. In this preferred embodiment, bit puller 30 is provided with a tapped recess 34 for engagement with the threaded end 24 of extension 22. (FIGS. 4 and 5) A nut 40, is also provided for engagement with the threaded end 24 of extension 22. The nut 40, is located on the threaded end 24 of the extension to position the threaded end 24 and puller bit 30, once the puller bit 30, has been properly aligned with respect to engagement end 14.

In a preferred embodiment of this invention, retractor 20 , is a fluid powered cylinder. This fluid may be one of any of a number of powered fluids including a vacuum, a pneumatic fluid, or hydraulic fluid, among others. In this preferred embodiment, a union 50 is provided to convey powered fluids to and from the retractor 20. In practice, union, 50, will include a trigger 52 for selectively activating the powered cylinder through the admission of fluid from the source of fluid to the retractor 20.

It will be readily anticipated that the function of the retractor 20 can be accomplished by means other than powered cylinder. For example, retractor 20, may comprise a solenoid connected to a source of electrical power. (FIG. 11) In this embodiment, retractor 20 is coupled to a source of electrical power through power lines 60. When power is supplied to the retractor 20 by means of the power lines 60, the retractor 20 will act to remove the cutting bit 90 from the cutting bit holder 80. In this embodiment, an electrical switch 62 can be provided to control the flow of power to the retractor 20 and, accordingly, to permit the user to selectively engage the retractor 20.

Alternatively, retractor 20 may comprise an electric motor including a body portion coupled to the mounting end of the brace and containing an armature 70 rotatable with respect to the frame 10 having a threaded rod 72 coupled to the armature 70. In this embodiment, the rod 72 extends through the mounting end 16 and a threaded follower 74 joining the rod to engagement end 14 so that rotation of the rod 72 causes longitudinal displacement of the bit puller 30 away from the engagement end 14. In this embodiment, power lines 60 are provided to join the retractor 20 to a source of electric power. Further in this embodiment, a switch 62 is provided to permit the user of the tool 100 to selectively actuate the retractor 20 through control of the electrical power.

Although the invention has been described in detail with reference to the illustrated preferred embodiment, variations and modifications exist within the scope and spirit of the invention as described and is claimed in the following claims.

What is claimed is:

1. A tool for separating a cutting bit from a cutting bit holding element, the tool comprising:

a bit puller having an aperture for lateral engagement with a cutting bit;

a brace having a mounting end and an engagement end, the engagement end circumscribing an inner apace containing the bit puller and having a sectioned opening to permit lateral introduction of the cutting bit into the inner space and bit puller, and a retractor fixed to the mounting and of the brace and coupled to the bit puller to move the bit puller between a first position where the bit puller enrages a cutting bit that is held in the cutting bit holding element, and a second position where the bit puller has separated the cutting bit from the cutting bit holding element, the brace sectioned opening being rotatably positionable relative to the bit puller so that the bit puller aperture is unaligned with the brace sectioned opening during the separation of the cutting bit from the holding element.

2. The tool of claim 1, further comprising a pull connector adjustably fixed to the retractor and to the bit puller to permit adjustment of the position the bit puller relative to the engagement end of the brace.

3. The tool of claim 2, wherein the retractor comprises a conventional air cylinder having a movable rod terminating a threaded end and said bit puller further comprises an threaded orifice for adjustable engagement with the threaded end of the rod.

4. The tool of claim 3, further comprising a nut threaded on the rod to securely position the bit puller to the rod after the bit puller has been adjustably positioned.

5. An extracting tool for extracting a cutting bit from a cutting bit holder, the cutting bit having a peripheral groove and the cutting bit holder having a shoulder extending laterally onward beyond the cutting bit, the tool comprising:

a brace having a first end configured to contact said shoulder of a cutting bit holder, a second end, and a side well connecting the first end and second end to define a cavity between the first and second ends, a bit puller moveably situated in the cavity, having a first end, a second end, a deft region joining the first end to a second end, the bit puller cleft region comprising a tube including an aperture to permit lateral capture of a top portion of a cutting bit within the cleft region, and a detent within the cleft region adjacent the first end of the bit puller for engaging said cuffing bit peripheral groove, and a powered retractor coupled to the brace second end and to be bit puller second end for moving the bit puller within the cavity by a distance sufficient to extract a cutting bit from a cutting bit holder.

6. The extracting tool of claim 5 wherein the brace side wall comprises a cylindrical member having a sectioned opening adjacent the first end to permit lateral placement of the brace around a cutting bit in a cutting bit holder.

7. The extracting tool of claim 5 wherein the powered retractor comprises a fluid powered cylinder coupled to the brace second end and containing a movable piston, having a piston rod fixed to the piston, the piston rod extending through the brace second end and coupling to the bit puller second end, and a union for joining the cylinder to a source of fluid.

8. The extracting tool of claim 7 wherein the source of fluid is one selected from the group consisting of a vacuum source, a pneumatic source, and a hydraulic source.

9. The extracting tool of claim 7 wherein the union further comprises a trigger for selectively actuating the powered cylinder through the admission of fluid from the source of fluid.

10. An extracting tool for exacting a cutting bit from a cutting bit holder, the cutting bit having a peripheral groove and the cuffing bit holder having a shoulder extending laterally outward beyond the cutting bit, the tool comprising:

a brace having a first end configured to contact said shoulder of a cutting bit holder, a second end, and a side wall connecting the first end and second end to define a cavity between the first and second ends, a bit puller moveably situated in the cavity, having a first end, a second end, a cleft region joining the first end to a second end, and a detent within the cleft region adjacent the first end of the bit puller for engaging said cutting bit peripheral groove, and a powered retractor coupled to the brace second end and to the bit puller second end for moving the bit puller within the cavity by a distance sufficient to extract a cutting bit from a cutting bit holder, the powered retractor having a fluid powered cylinder coupled to the brace second end and containing a movable piston, having a piston rod fixed to the piston, the piston rod extending through the brace second end and coupling to the bit puller second end, a union for joining the cylinder to a source of fluid, and a length-wise adjustable coupling between the bit puller second end and the piston rod to permit adjustment of the position of the bit puller within the brace cavity.

11. An extracting tool for extracting a cutting bit from a cutting bit holder, the cutting bit having a peripheral groove and the cutting bit holder having a shoulder extending laterally outward beyond the cutting bit, the tool comprising:

a brace having a first end configured to contact said shoulder of a cutting bit holder, a second end, and a side wall connecting the first end and second end to define a cavity between the first and second ends, the brace side wall including a cylindrical member having a sectioned opening adjacent the first end to permit lateral placement of the brace around a cuffing bit in a cutting bit holder, a bit puller moveably situated in the cavity, having a first end, a second end, a cleft region joining the first end to a second end, and a detent within the cleft region adjacent the first end of the bit puller for engaging said cutting bit peripheral groove, the bit puller cleft region including a tube including an aperture to permit lateral capture of a top portion of a cutting bit within the cleft region of the bit puller, end the bit puller being rotatable within the brace cavity to adjust the alignment of the bit puller aperture with respect to the brace side wall sectioned opening, and a powered retractor coupled to the brace second end and to the bit puller second end for moving the bit puller within the cavity by a distance sufficient to extract a cutting bit from a cutting bit holder.

* * * * *

UNITED STATES PATENT AND TRADEMARK OFFICE
CERTIFICATE OF CORRECTION

PATENT NO. : 6,526,641 B1
DATED : March 4, 2003
INVENTOR(S) : Winchester E. Latham It is certified that error appears in the above-identified patent and that said Letters Patent is hereby corrected as shown below:

Column 6,
Line 22, change "apace" to -- space --
Line 57, change "deft" to -- cleft --

Signed and Sealed this

Fifteenth Day of April, 2003

JAMES E. ROGAN
*Director of the United States Patent and Trademark Office*